No. 725,872. PATENTED APR. 21, 1903.
J. T. RENAS.
BALING PRESS.
APPLICATION FILED JAN. 24, 1902. RENEWED JAN. 21, 1903.
NO MODEL. 2 SHEETS—SHEET 1.
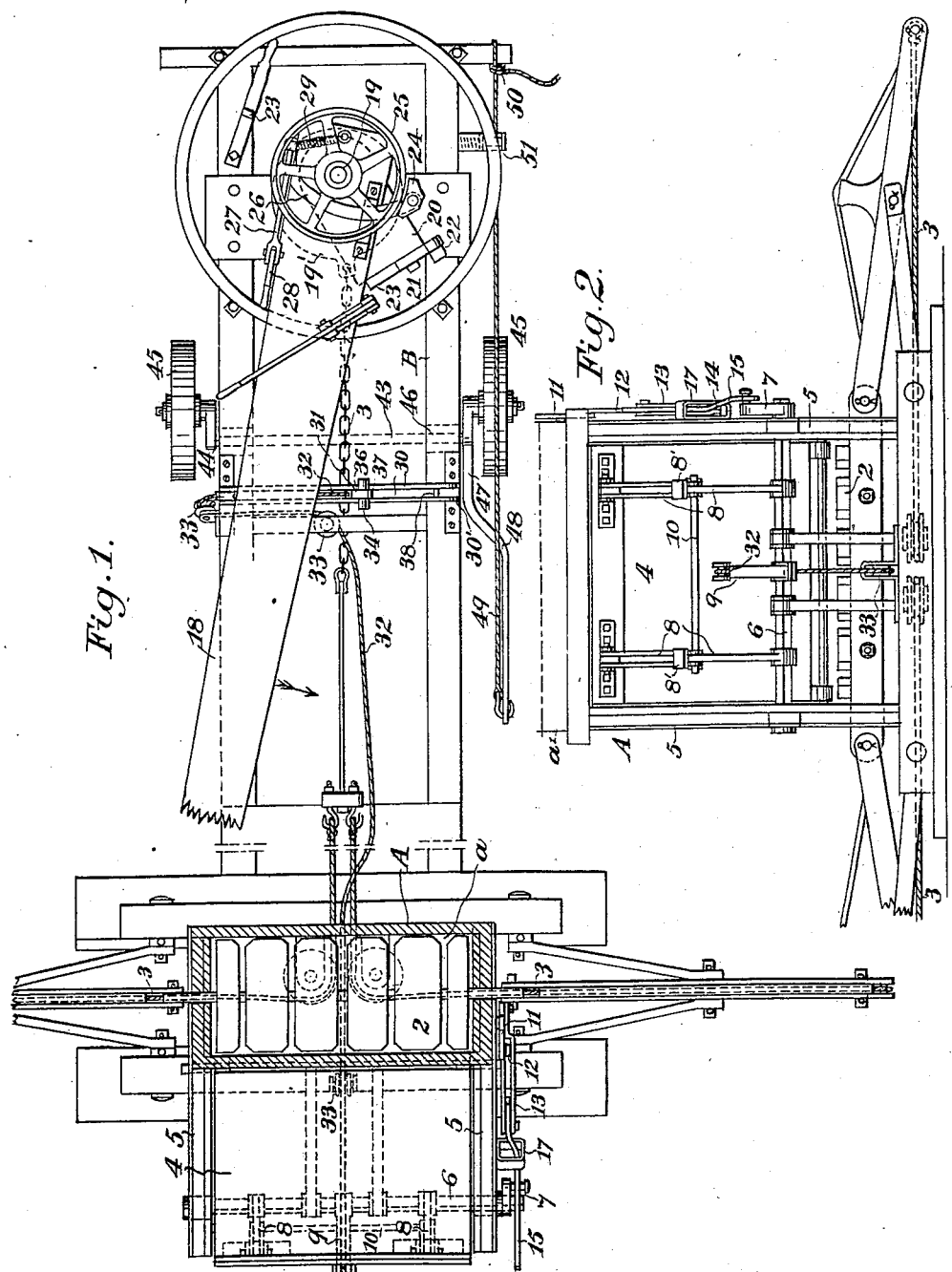
Witnesses,
Inventor,
John T. Renas No. 725,872. PATENTED APR. 21, 1903.
J. T. RENAS.
BALING PRESS.
APPLICATION FILED JAN. 24, 1902. RENEWED JAN. 21, 1903.
NO MODEL. 2 SHEETS—SHEET 2.
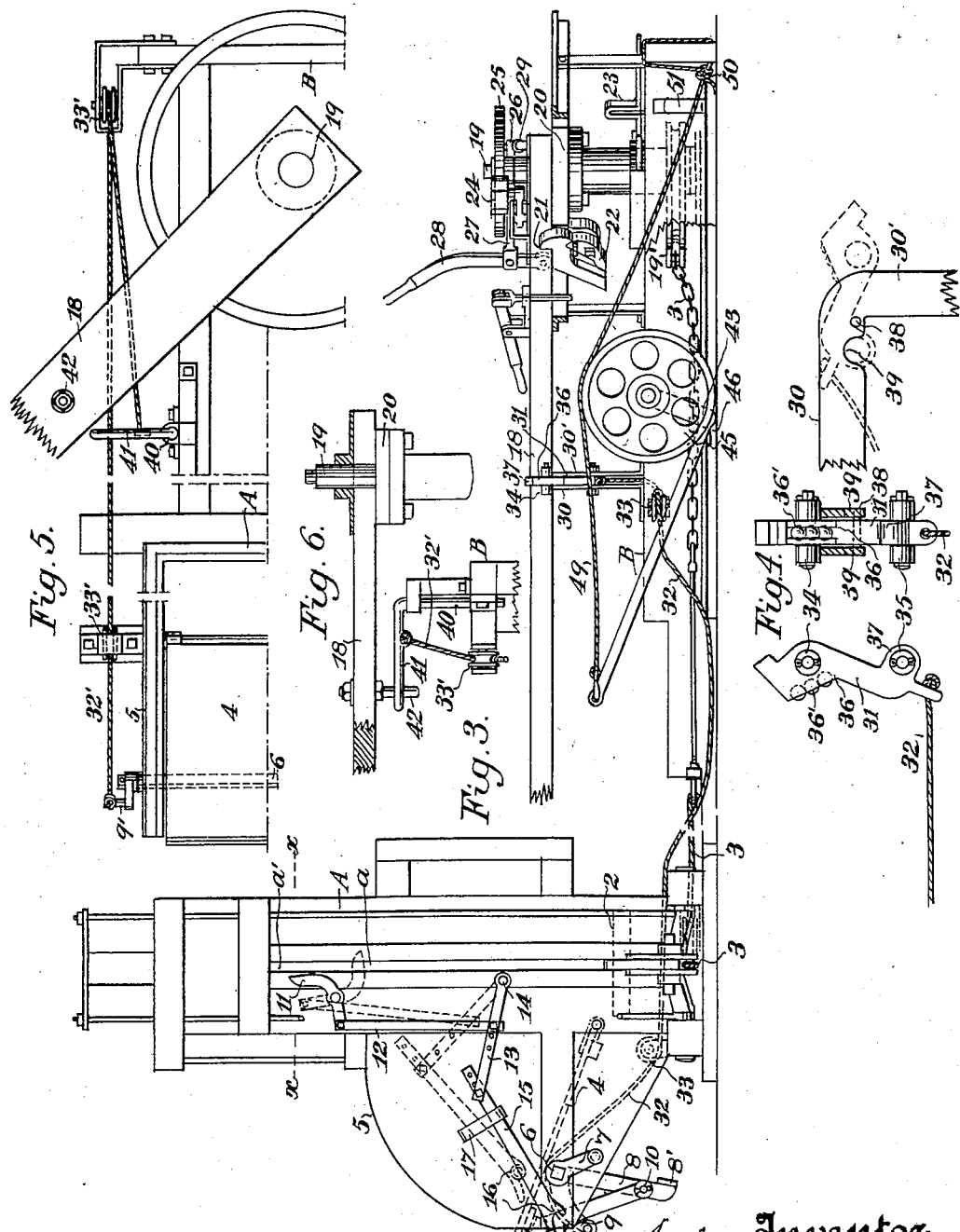
Witnesses,
Inventor,
John T. Renas
By Dewey Strong & Co.
Atty.

UNITED STATES PATENT OFFICE.

JOHN T. RENAS, OF PETALUMA, CALIFORNIA.

BALING-PRESS.

SPECIFICATION forming part of Letters Patent No. 725,872, dated April 21, 1903.

Application filed January 24, 1902. Renewed January 21, 1903. Serial No. 140,033. (No model.)

*To all whom it may concern:*

Be it known that I, JOHN T. RENAS, a citizen of the United States, residing at Petaluma, county of Sonoma, State of California, have invented an Improvement in Baling-Presses; and I hereby declare the following to be a full, clear, and exact description of the same.

My invention relates to improvements in machines for compressing hay into bales.

It consists of certain novel features in presses of the vertical type, and particularly in the feed mechanism thereof, whereby the feed-gate is automatically operated in relation to the movement of the plunger.

It also consists of a brake by which the descent of the plunger is regulated, a means of rendering the horse-power portable, and of details more fully to be hereinafter set forth, having reference to the accompanying drawings, in which—

Figure 1 is a plan of my invention, the horizontal section of the press taken at the line $x\ x$ of Fig. 3. Fig. 2 is a front elevation of the press, the upper part being omitted. Fig. 3 is a longitudinal elevation of the press and power mechanism. Fig. 4 represents enlarged detail views of the lifting-latch and end of the guide-rails. Fig. 5 is a plan showing a modification for operating the press-door. Fig. 6 is a side view of the same.

A represents a press-box of the ordinary vertical type, having a reciprocating plunger or follower 2, operated through the chain 3 from a source of power, as a horse-power. The lower portion of the rear wall of the box has a feed-opening closable by the gate 4. This gate is pivoted at the bottom, so as to swing downward and outward and offer an inclined platform or chute by which the passage of the hay into the feed-chamber and upon the plunger is facilitated. The movement of the gate takes place between the vertical walls 5. The manner of closing and opening this gate is as follows: Between the guide-walls 5 there extends the rock-bar 6, suitably journaled and having on one end a crank-lever 7. Upon the bar 6 the gate ordinarily rests when open, thus serving as a substantial stop or support. As the bar is rotated the gate is moved to open or close by means of knee-levers 8, one member of which latter is fixedly secured to the bar and the other pivotally secured to the gate. The rotation of the bar is effected by means of a lever 9, secured to the bar between the knee-levers. This lever is preferably segmental and provided with a groove on its convex surface. When said bar is rotated to close the gate, the knee-levers open out so their members form practically a straight line and are prevented from passing beyond such position by means of the stops 8' upon one of the members. A cross-bar 10 adds rigidity to and prevents lateral displacement of the levers. The closing of this gate is timed to operate in unison with the upward movement of the follower in a manner to be shown later. Its opening is automatically effected by means of the follower acting to turn the before-mentioned crank 7, and so rotate the bar in a reverse direction. This is accomplished by means of a series of levers and connections, as follows: Upon the press-box I provide a lever 11, one end of which is adapted to engage the follower on its upward movement. To the other end of this lever is attached a link 12, which connects with a lever 13, fulcrumed as at 14. The end of this latter lever connects with a bar 15, whose lower end is formed with a heel 16, adapted to bear against the crank 7. Thus as the follower moves upward and passes from the feed-chamber $a$ into the baling-chamber $a'$ of the press-box it strikes the lever 11, causing an outward limited pushing movement of the bar 15 against the upwardly-projecting crank 7, and thus rotates the bar 6 and opens the gate. The bar simply rests on the crank by its own weight and is held in position by means of guides 17. The movement given to the crank by the bar 15 on opening the gate is just sufficient to "break" the knee-levers and throw the gate beyond its center of gravity, when it drops by its own weight into position as in the first instance. The guides 17 serve also to hold the bar 15, so that the heel 16 is directly in the line of travel of the crank, insuring the engagement of the bar with the crank whenever the latter is lifted.

I prefer to make the rock-bar 6 square in cross-section and slip the journal-sleeves and knee-levers on over it. The parts are thus readily interchangeable.

The gate and plunger are operated in unison through the medium of a horse-power, as follows: This horse-power consists of the frame B, upon which is the usual sweep 18, mounted loosely on the vertical shaft 19. On this shaft is secured a sheave or segmental lever 19', to which the chain leading to operate the plunger attaches. To the shaft is also fixed the arm 20, carrying a pivoted lug or stop-lever 21, adapted to engage the sweep in its revolution, and so rotate the shaft. A tripping-lever 22 engages said lever 21 and is adapted to strike a stop 23 when the plunger has reached a proper height, thus releasing the lever 21 from engagement with the sweep, allowing the shaft and its fixed parts to turn backward independently of the sweep, while the plunger drops to the bottom of the press-box again to be in readiness for its next charge of hay. That the shaft should not revolve too rapidly and cause too sudden a fall of the plunger, I have provided a brake 24, engaging the periphery of a wheel 25, fixed to the shaft. The brake is controlled by the operator through means of the curved lever 26, link 27, and lever 28. A spring 29 serves to hold the brake normally out of contact with the wheel. The closing of the gate 4 is effected by the sweep in the following manner: Two horizontal guides 30 are disposed so that the sweep just passes along their upper edge, engaging a sliding carrier or latch, to which a chain or other suitable flexible connection 32 is attached, the other end of the chain connecting with the segmental lever 9 to move the gate. The chain passes around suitable direction-pulleys 33. The carrier is of peculiar construction and consists of a plate or block 31, having the friction-rollers 34 and 35, the one adapted to travel on the top of the guides or track 30 and the other on the lower edge of the same. A cut-out portion on one side of this block offers a projection 36 for engagement with the sweep. The engaging face of this projection is made antifrictional by means of the balls 36'. The opposite side of the block has a cut-out portion to form a projection 37 below the track, the shape of the block being somewhat that of a letter S with straight sides. Assuming the gate to be open and the follower down, the operation would be as follows: As the sweep turning independently of the shaft 19 comes upon one end of the guides or track 30 it engages the projection 36 and takes the carrier to the opposite end 30' of the track, closing the gate 4. Near this end of the track a pin 38 is disposed across the path of the carrier, which serves as a pivot for the carrier to turn on. Rearward of this pin are depressions 39 in the under side of the track for the reception of the rollers 35, while the rollers 34 drop over the end of the track, allowing the sweep to continue its revolution. The end 30' of the track is so curved as to permit the carrier to return to its position in the first instance when any draw is exerted on the chain or rope 32. As the sweep leaves the end of the track it engages the stop-lever 21, whereupon the follower is lifted. The gate remains closed until the follower contacts with the lever 11 and causes the gate to open, as before described, and by means of suitable tripping devices, as shown, the plunger is released at the proper moment and returned to its position in the feed-chamber of the press-box. The revolution of the sweep may thus be continuous, and each part of the work is taken up automatically and done with precision.

I may at times modify my device for closing the gate as follows: Instead of attaching the segmental lever 9 centrally of the rock-shaft 6 I secure it to the end of the bar, as 9'. For the track and sliding carrier I substitute a vertical rock-shaft 40, having a fixed horizontal arm 41. The end of the chain or rope 32' is secured to this arm and leads around direction-pulleys 33' to the lever 9'. The arm 41 is engaged by a pin 42 on the sweep, serving to rotate the arm, and thus close the gate. The plunger is lifted and the gate re-opened as before.

A further feature of my invention is the means I employ to render the horse-power portable when it is necessary to move the device from one place to another. When in use the horse-power must rest upon the ground, and so cannot be mounted on the ordinary running-gear. I have shown an axle 43, having a portion 44 dropped approximately a distance equal to the radius of the wheels 45. This axle is suitably journaled at 46 on the bottom of the frame B, and ordinarily the axle rests directly on the ground. From the lowermost portion of the axle there extends forward an arm 47, having an offset 48, whereby the end of the arm is brought into the same plane with the wheel 45. On this wheel as a fulcrum the arm is turned and the frame B lifted by means of a rope 49, passing over the top of the wheel and having a suitable fastening 50. The arm is turned till it is engaged by a latch 51, when the frame is entirely clear of the ground and may be transported, as desired. This feature is of great importance, as it is frequently necessary to move the press and power from one stack to another in the work of baling.

Having thus described my invention, what I claim as new, and desire to secure by Letters Patent, is—

1. The combination in a baling-press, of a press-box, having a feed-chamber and a baling-chamber, a follower movable in said box, a gate hinged in the opening in said feed-chamber, a horizontally-disposed rock-shaft, knee-levers connecting said shaft and the gate, a transverse guide, a carrier to travel thereon and having upper and lower projections, means connecting the carrier and follower, means engaging one of said projections and moving the carrier forward to close the gate and means engaging the other projection to release the carrier from its forward movement.

2. The combination in a baling-press, of a press-box, a follower movable therein, a feed-gate hinged in said press-box, a rock-shaft, knee-levers connecting said shaft and gate, connections of said shaft with a source of power whereby the shaft is rotated to close the gate, and connections of said shaft with the follower whereby the gate is opened when the follower is reciprocated through the box, said last-named connections including a lever located in the path of the follower and engaged thereby during the completion of its compressing movement and a push-bar and connections between the same and the said lever.

3. The combination in a baling-press, of a press-box, a follower movable therein, a hinged gate pivoted in the opening in the feed-chamber of the box, a rock-shaft, connections of said rock-shaft with said gate whereby the latter is closed or opened when the former is rotated, means whereby said rotation in one direction is effected to close the gate, a crank on one end of said shaft, a lever adapted to engage the follower during the completion of the upward movement of the latter, a push-bar for engaging the crank and intermediate connections of said lever and bar whereby the crank is rotated to open the gate by said engagement of the lever and follower.

4. The combination with a press-box having a follower movable therein, and a gate pivoted in the feed-opening in said box, of a means by which said gate is operated, said means comprising a carrier consisting of a piece having a cut-out portion at one side and a projection at the opposite side, a guide for the carrier, said carrier having a flexible connection attached to it and means connecting the latter with the gate, a revoluble member to engage the cut-out portion of the carrier to move the carrier in one direction on its guide and thereby close the gate, and a stop in the path of the carrier for tripping the carrier and releasing it from its forward movement.

5. In a baling-machine, the combination with a press-box having a follower movable therein and a hinged gate pivoted in the feed-opening of said box, of a means by which said follower and gate are operated in unison, said means comprising a revoluble shaft, an arm independently revoluble on said shaft, connections of said shaft with the plunger whereby the latter is lifted when the shaft is revolved, a transversely-movable carrier having one end of a rope or chain secured thereto, connections of the other end of said rope or chain with the gate, a guide-track for the carrier, said carrier extending below the track and having a projection above the same, said arm adapted to engage this projection during a portion of the revolution of the arm whereby the gate is closed, a projection upon the shaft with which said arm also engages during a portion of the revolution of the arm whereby said shaft is revolved and the follower operated, a stop with which the lower extension of the carrier engages to release the carrier from its forward movement, and means whereby said arm and shaft are released from such engagement.

6. The combination with a press-box, a follower movable therein, and a gate pivoted in the feed-opening of the box, of a transversely-arranged track, a carrier adapted to engage the upper and lower sides of said track and having a projection above the track, means connecting the carrier with the gate, and a revoluble member for engaging the projection of the carrier and moving the carrier, substantially as described.

7. The combination with a press-box having a follower movable therein and a gate hinged in the opening in the feed-chamber, of a track upon which a carrier is adapted to travel, connection of this carrier with the gate, said carrier adapted to bear on the upper and lower sides of the track and having a projection above the track to be engaged, by which engagement the carrier is moved forward on the track to close the gate, a projection on the carrier below the track, and a stop with which said lower projection engages to release said carrier from its forward movement.

8. The combination with a press-box having a follower and means for admitting hay to said box, of a revoluble shaft, connections of this shaft with the follower, means by which said shaft is revolved and the follower lifted, a mechanism by which said revolution is checked and the shaft allowed to revolve in the opposite direction and allow the follower to descend, a wheel upon said shaft, a brake-shoe adapted to engage with the periphery of said wheel and regulate the descent of said follower, a curved lever carrying said shoe, means by which the shoe is held normally out of contact with the wheel, and connections with the end of said curved lever whereby the brake may be operated.

9. The combination in a baling-press, of a press-box, a follower movable therein, a gate pivoted in the opening of the feed-chamber of said box, a rock-shaft, knee-levers connecting said shaft and gate, a revoluble vertical shaft with which said follower is connected, an arm independently revoluble on said shaft, a transversely-movable carrier with which said arm engages during a portion of a revolution, connections of this carrier with the rock-shaft whereby the latter is rotated to close the gate, means by which said vertical shaft is engaged by the arm during a portion of a revolution of the latter, and the follower lifted, connections of the follower with the aforesaid rock-shaft, said connections including a lever in the path of the follower and a push-bar and connections between the bar and lever whereby the rock-shaft is rotated in a reverse direction from that caused by the movement of the carrier, and the gate opened, and means by which said arm and vertical shaft are disengaged when the follower reaches the end of its stroke and a brake by which the descent of the follower is regulated.

In witness whereof I have hereunto set my hand.

JOHN T. RENAS.

Witnesses:
S. H. NOURSE,
JESSIE C. BRODIE.